(12) United States Patent
Kurz

(10) Patent No.: US 9,013,424 B2
(45) Date of Patent: Apr. 21, 2015

(54) METHOD FOR ENCODED INPUT AND CONTROL BY FINGERPRINT

(75) Inventor: Michael Kurz, Vienna (AT)

(73) Assignee: Deutsche Telekom AG, Bonn (DE)

( * ) Notice: Subject to any disclaimer, the term of this patent is extended or adjusted under 35 U.S.C. 154(b) by 76 days.

(21) Appl. No.: 13/384,727

(22) PCT Filed: Jul. 27, 2010

(86) PCT No.: PCT/EP2010/004603
§ 371 (c)(1),
(2), (4) Date: Jan. 25, 2012

(87) PCT Pub. No.: WO2011/015301
PCT Pub. Date: Feb. 10, 2011

(65) Prior Publication Data
US 2012/0120013 A1    May 17, 2012

(30) Foreign Application Priority Data
Aug. 4, 2009 (DE) .......................... 10 2009 035 966

(51) Int. Cl.
*G06F 3/041* (2006.01)
*G06F 21/36* (2013.01)
*G06F 3/0488* (2013.01)
*G06F 21/32* (2013.01)

(52) U.S. Cl.
CPC .............. *G06F 21/36* (2013.01); *G06F 3/0488* (2013.01); *G06F 21/32* (2013.01)

(58) Field of Classification Search
CPC ...................... G06F 3/0547; G06F 3/04883
USPC .................................................. 345/173–182
See application file for complete search history.

(56) References Cited

U.S. PATENT DOCUMENTS

| 6,476,797 | B1 | 11/2002 | Kurihara | |
|---|---|---|---|---|
| 7,325,205 | B2 | 1/2008 | Duevel | |
| 7,725,511 | B2 * | 5/2010 | Kadi | 708/145 |
| 8,023,700 | B2 * | 9/2011 | Riionheimo | 382/116 |
| 2011/0009813 | A1 * | 1/2011 | Rankers | 604/66 |

FOREIGN PATENT DOCUMENTS

| DE | 10336814 A | 3/2005 |
|---|---|---|
| JP | 2004326472 B | 11/2004 |

* cited by examiner

*Primary Examiner* — Kenneth B Lee, Jr.
(74) *Attorney, Agent, or Firm* — Andrew Wilford

(57) ABSTRACT

The invention relates to a method for acquiring user inputs and for performing certain functions of an electronic device (1), in particular a computer and/or a mobile radio terminal, and to a device (1) to carry out this method, wherein the acquisition takes place by means of a touch-sensitive display surface (2), which is configured to register a fingerprint (3), wherein a touch of predetermined limited areas of the display surface (2) by a user is expected in order to activate and/or select functions. A touch of the display surface (2) in one or more predetermined areas with one or more predetermined fingers simultaneously or successively in a predetermined sequence is expected. The display surface (2) registers the fingerprints (3) of the user when it is touched, and a predetermined function of the device (1) is activated and/or performed depending on the touched area or areas of the display surface (2), the registered fingerprints (3) and the sequence.

20 Claims, 13 Drawing Sheets

METHOD FOR ENCODED INPUT AND CONTROL BY FINGERPRINT

CROSS REFERENCE TO RELATED APPLICATIONS

Figure 1:
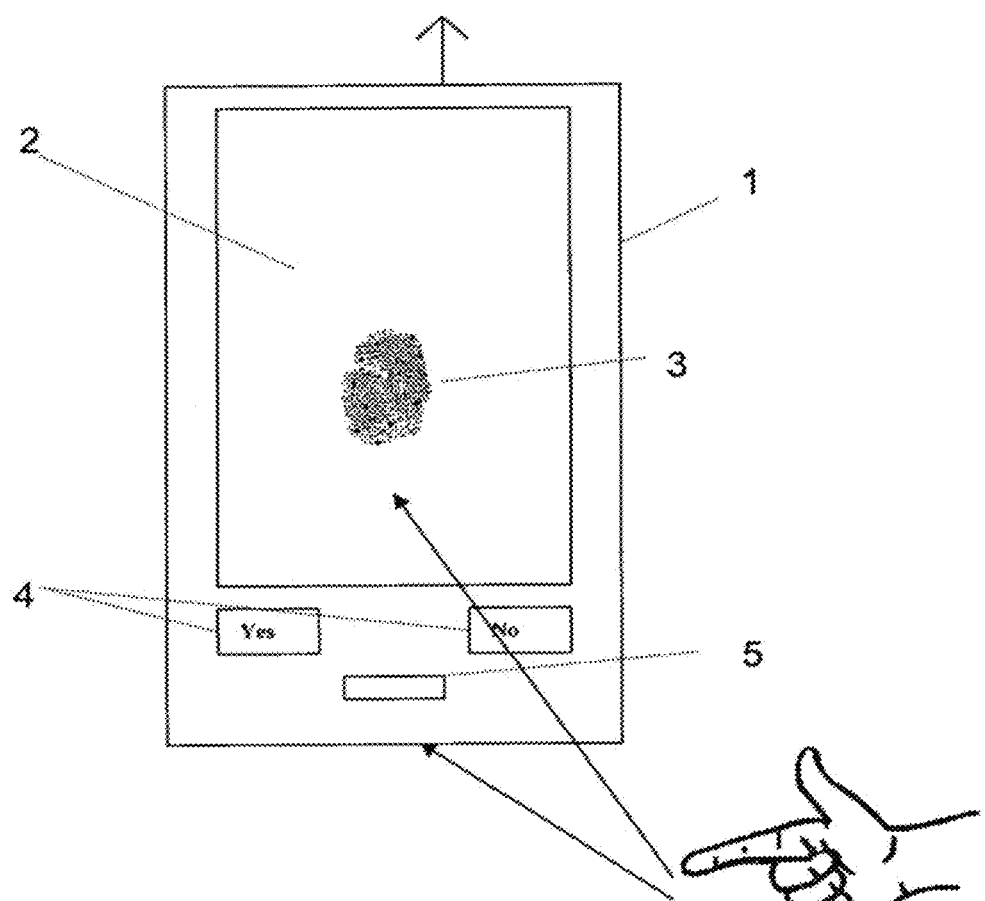

This application is the US-national stage of PCT application PCT/EP2010/004603 filed 27 Jul. 2010, published 10 Feb. 2011 as WO2011/015301, and claiming the priority of German patent application 102009035966.4 itself filed 4 Aug. 2009, whose entire disclosures are herewith incorporated by reference.

This invention relates to a method for acquiring user inputs and for performing certain functions of an electronic device, in particular a computer and/or a mobile radio terminal, wherein the acquisition takes place by means of a touch-sensitive display surface, which is configured to register a fingerprint, wherein a touch of predetermined limited areas of the display surface by a user is expected in order to activate and/or select a specific function.

Methods of this type for acquiring user inputs and for performing certain functions are known. Such touch-sensitive display surfaces are also referred to as so-called touch screens. Various fields of application for touch screens of this type are known. In particular, mobile radio terminals are now also known is which have touch-sensitive display surfaces.

The functional variety of mobile telephones and computers is constantly increasing. In order to render possible a simple input and activation of functions, it is known to equip devices of this type such as mobile telephones and computers with keypads and/or touch-sensitive displays (display surfaces) the latter displaying symbols and pictograms indicating a predetermined restricted areas on the display each of which can be touched to activate a certain function of the device.

It is also known to provide fingerprint readers for authorization purposes, in order to deny access to the mobile telephone or to the computer or other device to unauthorized users. It is also known to link certain functions such as quick dial, etc. to assigned keys, so called hot keys, or to a combination of keys, so-called shortcuts, wherein, however, the number of keys is usually very low, in particular with mobile radio terminals with touch-sensitive displays. With current authorization methods, a personal identification number PIN of the SIM card of the mobile telephone is requested (SIM: Subscriber Identity Module, PIN: Personal Identification Number). However, since the user has to memorize a large number of PINs in everyday life, this often represents a challenged not to be underestimated.

It is, therefore, an object of the invention to further develop a method of the type previously described in that on one hand to facilitate the input for the user, so that a variety of functions of the device can accessed and activated fast and easily, and on the other hand to simultaneously establish a reliable authorization of the user for these functions in order to prevent misuse.

This object is achieved according to the invention by a method according to claim 1 and by a device according to claim 10. Advantageous further developments of the invention are given in the dependent claims.

It is provided a method for acquiring user inputs and for performing certain functions of an electronic device, in particular a computer and/or a mobile radio terminal, wherein the acquisition takes place by means of a touch-sensitive display surface, which is configured to register a fingerprint, wherein a touch of predetermined limited areas of the display surface by a user is expected in order to activate and/or select a specific function, wherein a touch of the display surface is expected in one or more predetermined areas with one or more predetermined fingers simultaneously or successively in a predetermined sequence, the display surface registering the fingerprints of the user when it is touched, wherein a predetermined function of the device is activated and/or performed depending on the touched area or areas of the display surface, the registered fingerprints and the sequence. This means that a specific function is activated and/or performed if the predetermined area or areas of the display is touched with a specific predetermined finger or fingers in a specific predetermined sequence.

According to the invention, it is possible to assign specific activation schemes to a variety of function of the electronic device, the schemes being characterized by a specific area or areas, one or more specific fingers with which the area or areas is/are touched, and a specific sequence of the touch of the area or areas, the sequence including the case that two or more area are touched by two or more fingers simultaneously. Consequently, at least one area being touched more than one time with one finger or two or more different fingers in a specific sequence is needed to clearly identify a specific function which becomes activates when this predetermined area is touched with the predetermined finger or fingers in the predetermined sequence. Alternatively, the activation scheme assigned to a certain function can be characterized by two or more specific areas that have be touched by one finger or two or more different fingers successively or by two or more fingers simultaneously. In every case the fingerprint of a finger is used in addition to a predetermined area/areas and sequence to characterize an activation scheme. If the user uses an input scheme corresponding to a specific activation scheme assigned to a function, this function is activated and/or performed. The activation scheme and the input scheme respectively, is therefore an easy and convenient way for a user to get direct access to a specific function of an electronic device, in the way it is provided by a hot key or a short cut.

Thus, not only a certain area of the touch-sensitive display surface of the device is assigned to a certain function, but additionally at least one fingerprint of the user is registered so that not only a user input is recorded, but, due to the individuality of a fingerprint, an authentication of the user and an assignment of a specific function to a specific user is carried out at the same time. The registration of a fingerprint in the sense of the invention means that the touch-sensitive display surface in configured in that it is possible to register the dactylogram, i.e. the impression of the friction ridges of human fingers.

The function can be a function or a command of the electronic device activating a certain program, part of a program or hardware like an interface, an antenna, a port or the like. Alternatively, the function can relate to the entry of alphanumeric data or a selection of a user menu or a sub-menu, etc. However, a PIN entry or password entry can also be replaced by using the activation scheme according to the invention, since an authentication of the user is ensured by checking if the finger or fingers used for activation of the function matches the fingerprint with which the display is expected to be touched.

In a preferred embodiment, the function to be performed can enable the use of the device, hereby replacing the entry of a personal identification number PIN for enabling the use of the device.

For activation or selection of a specific function it is checked if the input scheme/input pattern of the user corresponds to a predetermined input scheme which was previously assigned to a specific function, and which is stored in a storage medium associated with the device having the touch-sensitive display surface. When the display registers a fingerprint, this fingerprint is recorded and checked for matching with one fingerprint or more fingerprints previously stored. The fingerprints can belong to same or to different persons. The fingerprint can be compared only with a specific fingerprint of one more expected input schemes, or, alternatively or in addition with a database of fingerprints. The latter makes it possible to identify the user and to give out a user specific failure message with information on the reason why the access to the function was denied, e.g. because he used the wrong finger. The fingerprint check is at least carried out for all fingerprints the display receives in the predetermined area or areas.

An increased security and a special protection against unauthorized use of the specific functions of the electronic device is ensured hereby, since it is no longer possible to intercept a PIN or a password, since instead at least one fingerprint of the user is recorded and checked.

According to the invention, several functions of the device can be determined and input schemes can be assigned to each of these functions. In order to activate and perform a specific one of these functions a touch of the display surface is expected in one or more predetermined areas with one or more predetermined fingers simultaneously or successively in a predetermined sequence.

In a preferred embodiment of the invention, an authorization of predetermined user input is carried out by recording one or more fingerprints, wherein a plurality of fingerprints of one or more persons are stored, to which respectively specific functions and/or commands are assigned.

On the one hand, a reliable authorization of the previously predetermined user input is rendered possible hereby. Furthermore, it is rendered possible hereby that an intuitive use of the device and direct access to functions is rendered possible for different users, since several fingerprints of different people can be stored, and an intuitive use is possible in that each user can define for himself personally different areas of the touch-sensitive display surface of the device and link them to freely determinable functions and/or commands.

Specific functions such as quick dial or special functions such as, for example, calendar, address book, etc., can thus easily be linked to corresponding read-in and saved fingerprints. The user needs only to press on the suitable display field with one of his fingers and have the fingerprint read in, thus applying a specific input scheme, and the correspondingly linked function will be activated. The read-in of the fingerprint can be performed optically, by analysis of the pressure distribution across the touched area, capacitively by analysis of the capacity distribution across the touched area, or by any other method.

This linking of the input scheme to a certain function is fixed once beforehand in an installation process and can be changed at any time. In particular, it is possible that a corresponding device such as, for example, a mobile telephone can also have different links depending on the user, such as in the following example:
  User 1: Using forefinger activates to address book
  User 1: Using middle finger activates GPS locator
  User 1: Using forefinger and middle finger activates a call to girl friend
  User 2: Using forefinger is a quick dial to answering machine
  User 3: Using forefinger activates a text processing program Furthermore, a combination of two or more fingers is also possible, for example, the simultaneous or successive placement of forefinger and middle finger. An acquisition of two fingerprints at the same time or one shortly after the other is carried out here by means of the touch-sensitive display (display surface). It is also possible to use not only the fingers of one hand but of both hands, i.e., to read in and store the corresponding fingerprints and to link these stored fingerprints assigned to individual areas of the touch-sensitive display surface, i.e., the touch-sensitive display, respectively to certain functions of the electronic device.

It is particularly advantageous that the inventive concept on which the invention is based is universally applicable, so that a use on a PC or other electronic devices is possible, e.g., as a replacement for requesting a password or connection with transactions in the field of electronic banking for authorization or with similar applications which require an authorization.

According to the invention, an input scheme of which one or more fingerprints form a part, is thus registered by means of a touch-sensitive display, wherein specific links and functions are assigned to activation schemes of which stored fingerprints form a part, and wherein a specific function is activated and/or performed if an input scheme is used which matches the activation scheme assigned to that function. The method according to the invention can be used, for example, to replace a PIN entry or password request.

In a preferred embodiment, different colors and/or symbols and/or pictograms of different sizes and/or alphanumeric characters, in particular of the same or different size are displayed on the touch-sensitive display surface successively and/or simultaneously, indicating different limited areas of the display surface, that can be touched. This thereby includes the combination of symbols and/or pictograms and/or alphanumeric characters of different sizes, i.e., for example, symbols or pictograms of different colors.

By using symbols and/or pictograms and/or colors and/or pictograms in different colors the display of the touch-sensitive display, i.e., the touch-sensitive display surface (touch screen) can thus be used in order to support an intuitive operation by the user, since it is easier to memorize certain symbols or colors than, for example, a personal identification number PIN or a password.

It is also possible, considering repeated inputs, to change colors, symbols, pictograms etc., so that the user is presented with different representations on the touch-sensitive display surface in order, for example, to be able to distinguish and delimit different sub-menus or functions from one another. An intuitive operation by the user also is supported and facilitated hereby in a particularly advantageous and simple manner.

A wide variety of combinations of colors and/or symbols and/or the size of the symbols is possible, in order to increase the number of the different combination possibilities enormously.

Preferably, different colors and/or symbols and/or pictograms and/or alphanumeric characters are statically or dynamically displayed in all or a part of the different limited areas of the touch-sensitive display surface. In particular, the colored areas and/or symbols and/or pictograms and/or alphanumeric characters can thereby be the same size or different sizes. A static assignment means that each area of the display surface always displays the same color and/or the same symbol and/or the same pictogram and/or the same alphanumeric character, and specific functions or commands of the electronic device are assigned thereto. Alternatively, however, a dynamic assignment can be given in of all or a part of the different limited areas of the touch-sensitive display surface, wherein depending on what was previously displayed on the display, and/or depending on the is user input at a certain area or areas, a different color and/or a different symbol and/or a different pictogram and/or a different alphanumeric character as previously displayed is now displayed, and in turn is linked to a specific function of the electronic device.

On the one hand, an intuitive use can be realized for the user hereby, and on the other hand it is furthermore possible to realize with a very small number of touch-sensitive areas, such as, for example, four or six different restricted areas, a large number of sub-menus and sub-functions for controlling the electronic device.

According to the invention, a user input for performing specific functions of the electronic device can be carried out by the basic concept, in that a touch carried out successively of certain areas of the touch-sensitive display surface with one or more of the user's fingers takes place, wherein a specific sequence is to be maintained.

An intuitive operation of the device is possible through the multiple repetition of the reading in of individual or different fingerprints of a user while maintaining a specific sequence, since the user automatically becomes accustomed to the corresponding input, which is nothing more than tapping the device with his fingers at specific points. Interception or misuse by a third person is completely ruled out thereby.

In a preferred embodiment, the display surface can be a part of the electronic device whose function or functions is/are controlled depending on the touched area or areas of the display surface, the registered fingerprints and the sequence. In an alternative embodiment, the display surface is a part of an is external device that controls the electronic device.

Preferably, a transmission of the data acquired in the external device to the electronic device (1) to be controlled is carried out via a wire connection and/or via a radio connection, in particular using a radio standard, in particular IRDA, Bluetooth, WLAN and/or RFID or the like.

In particular it is possible to assign an external reader device for recording the user input to another electronic device to be controlled, such as a computer, a bank automatic teller or the like, and thus to render possible universal applicability of the invention. In particular, an authentication by means of an external device on any PC that can communicate with a computer network, such as the Internet, with other computers is hereby possible, in order, for example, to authorize banking transactions.

According to the invention, it is furthermore provided an electronic device, in particular a computer and/or a mobile radio terminal, configured to carry out the method previously described.

Figure 2:
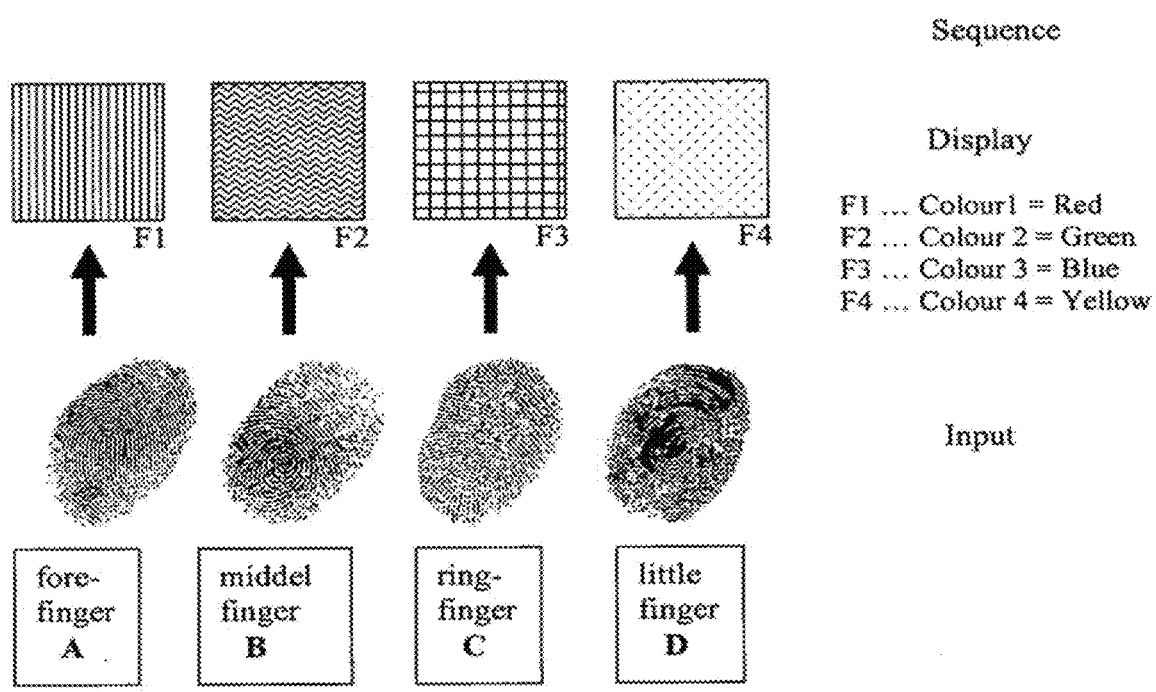
Figure 4:
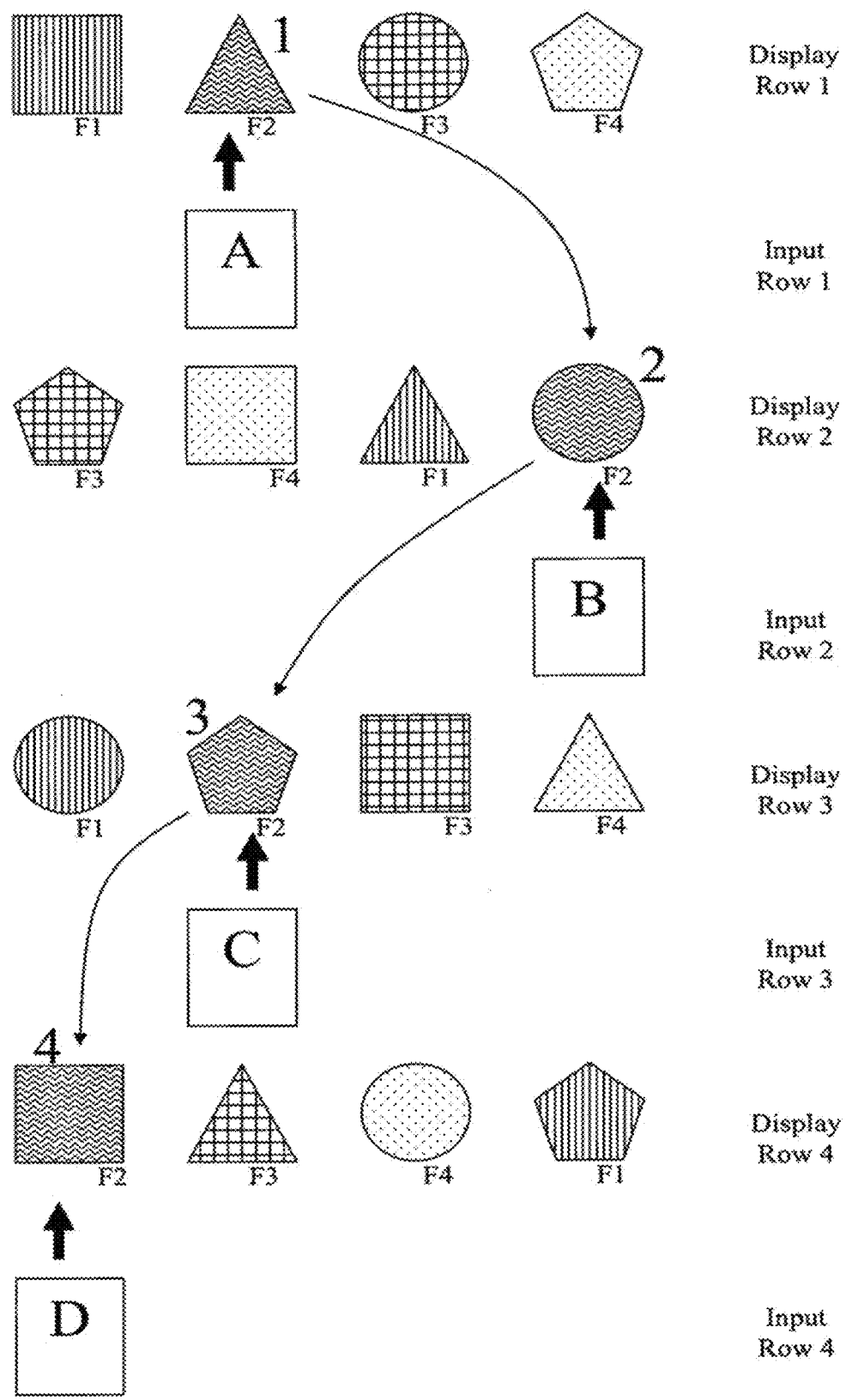
Figure 5:
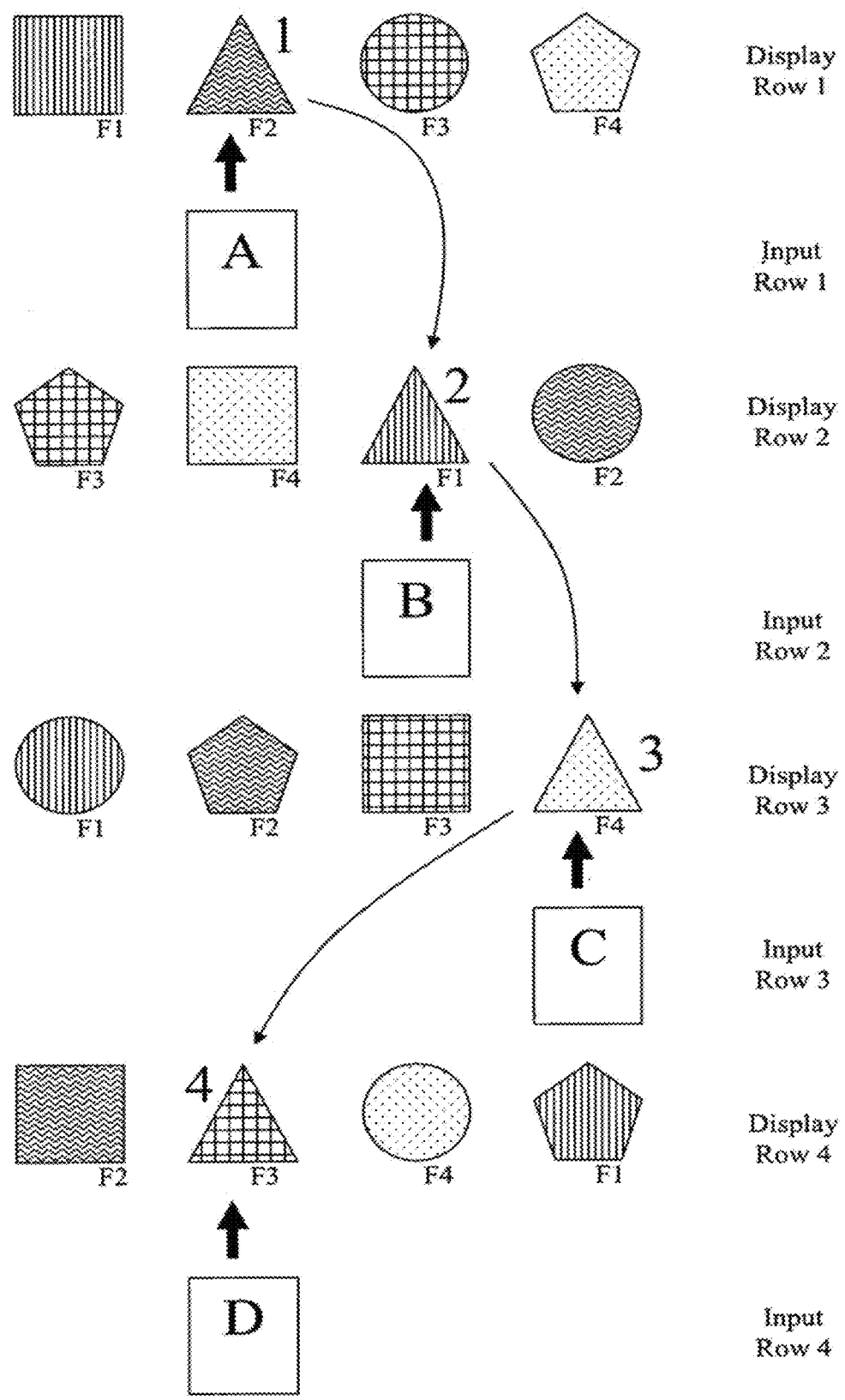
Figure 6:
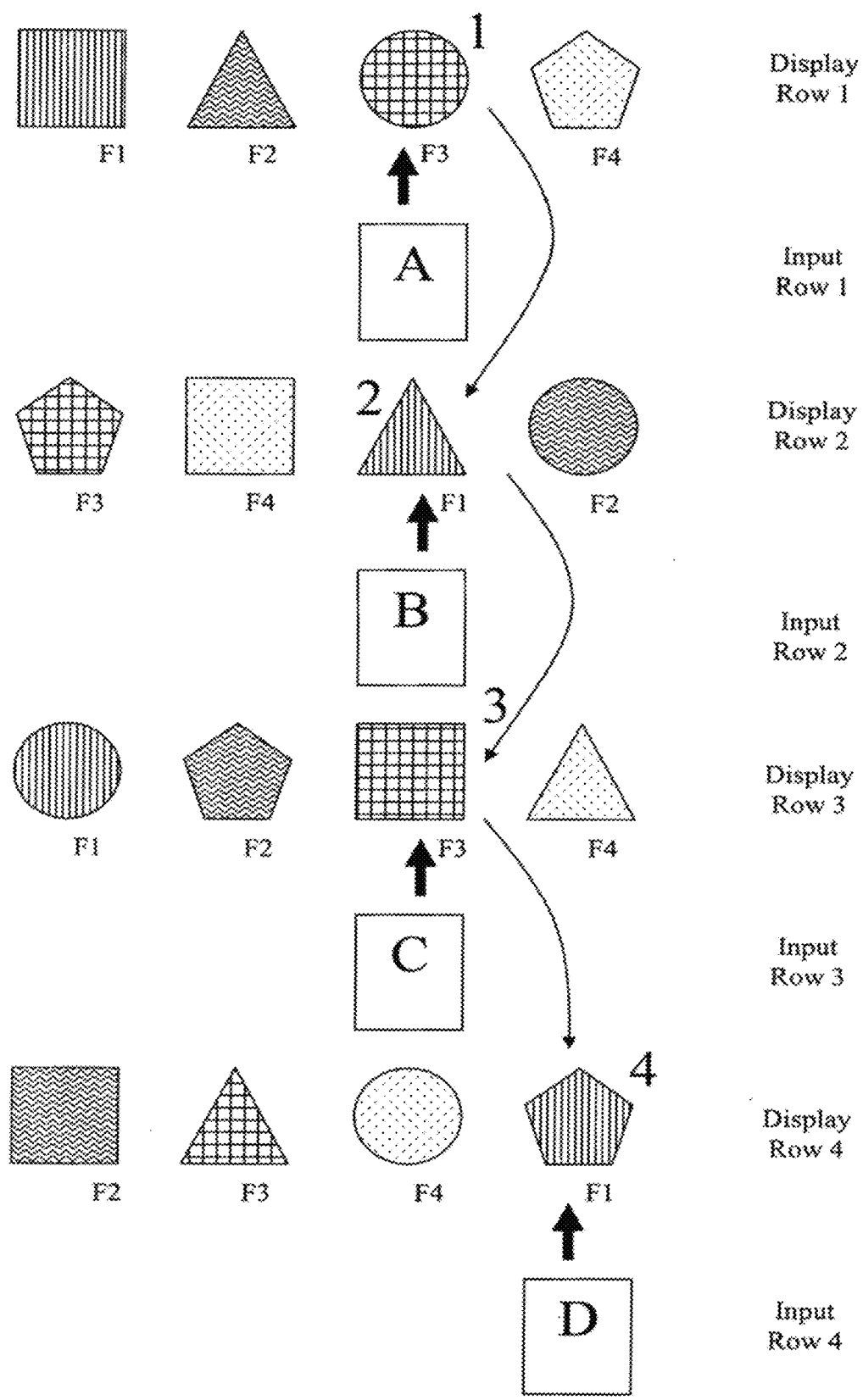
Figure 7:
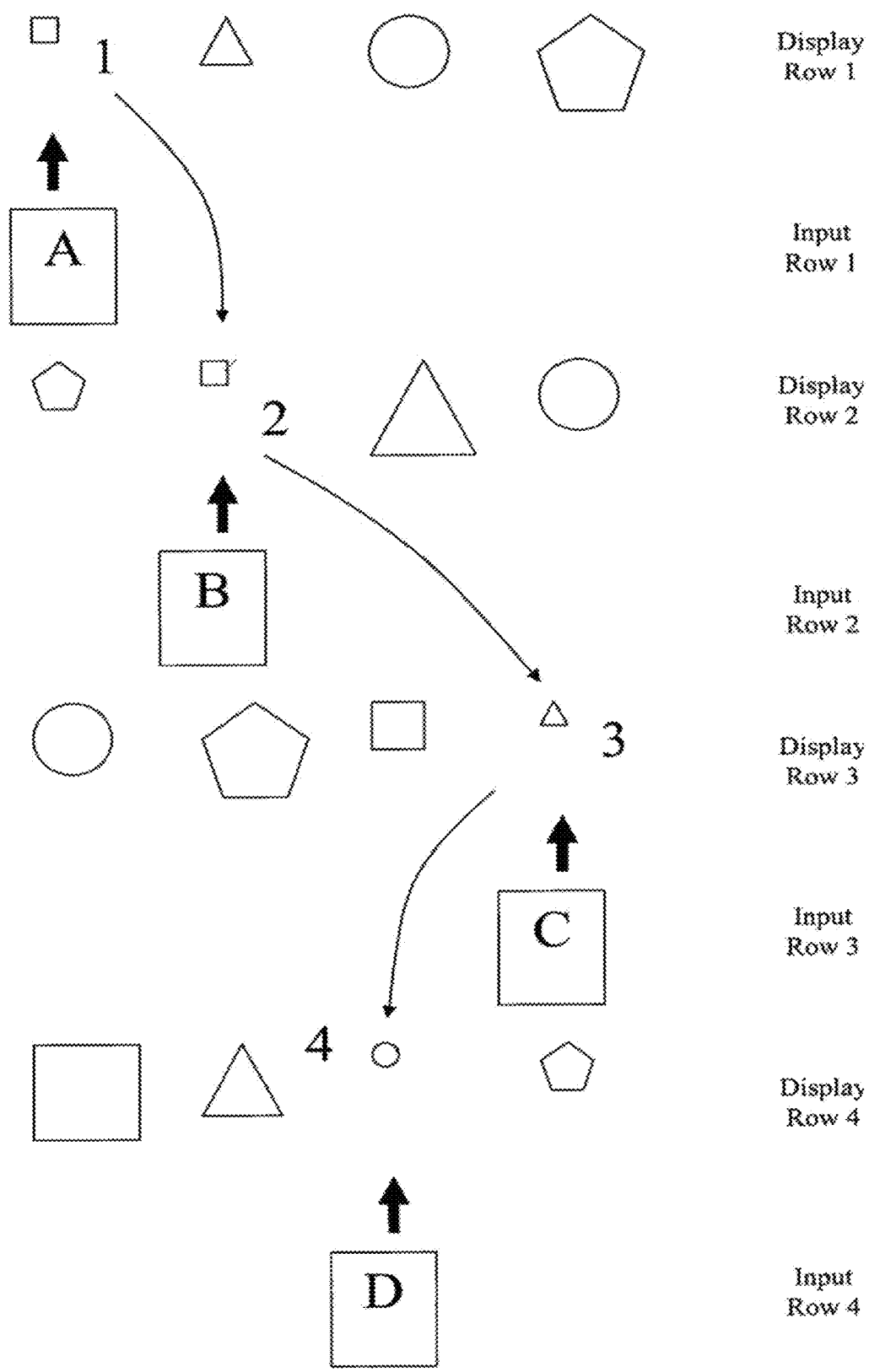
Figure 8:
Figure 9:
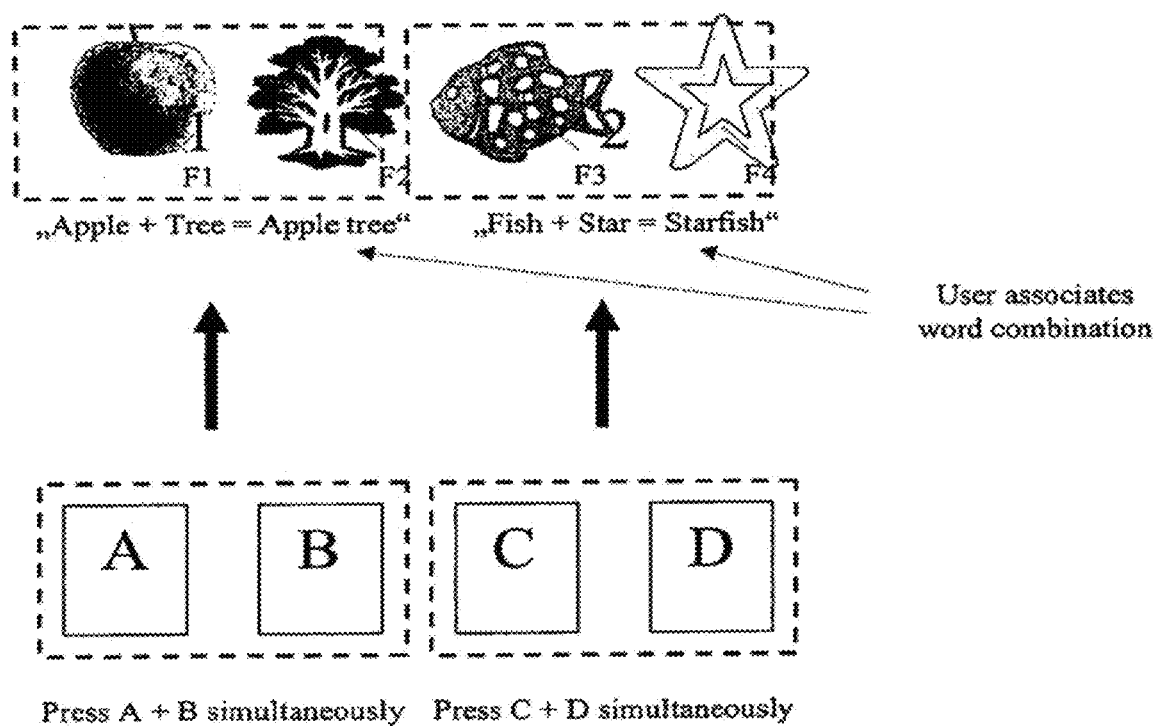
Figure 10:
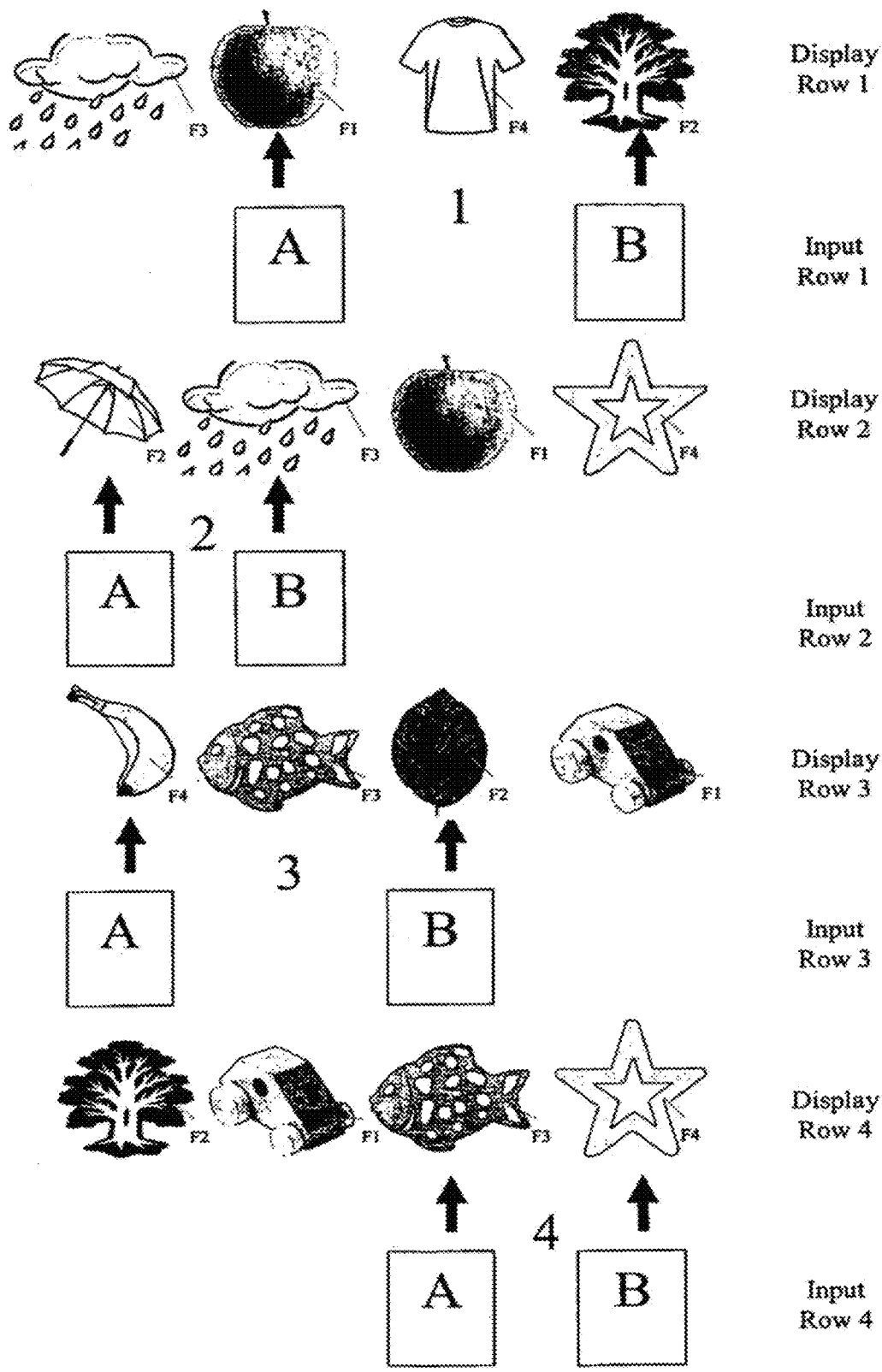
Figure 11:
Figure 12:
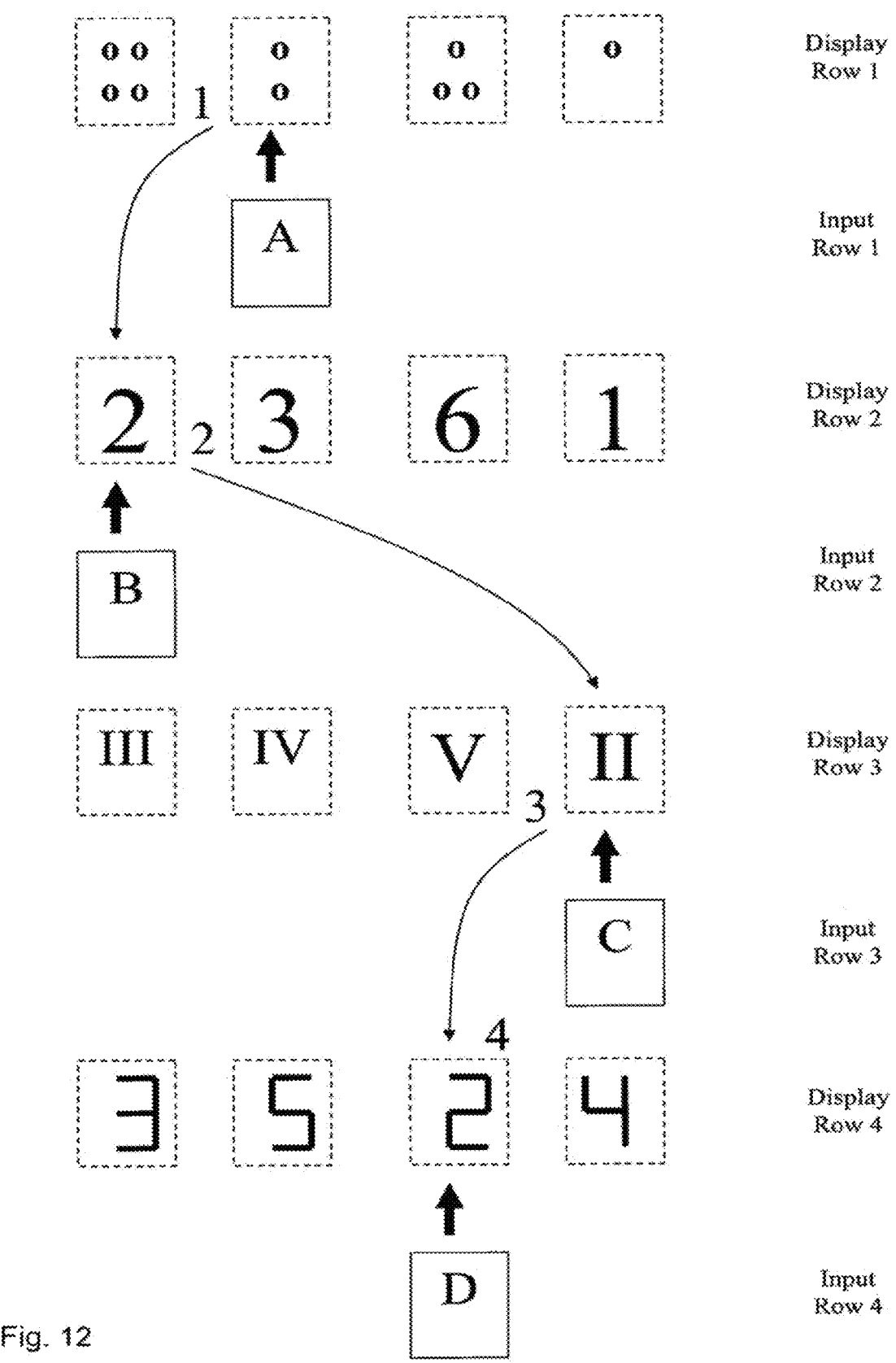
Figure 13:
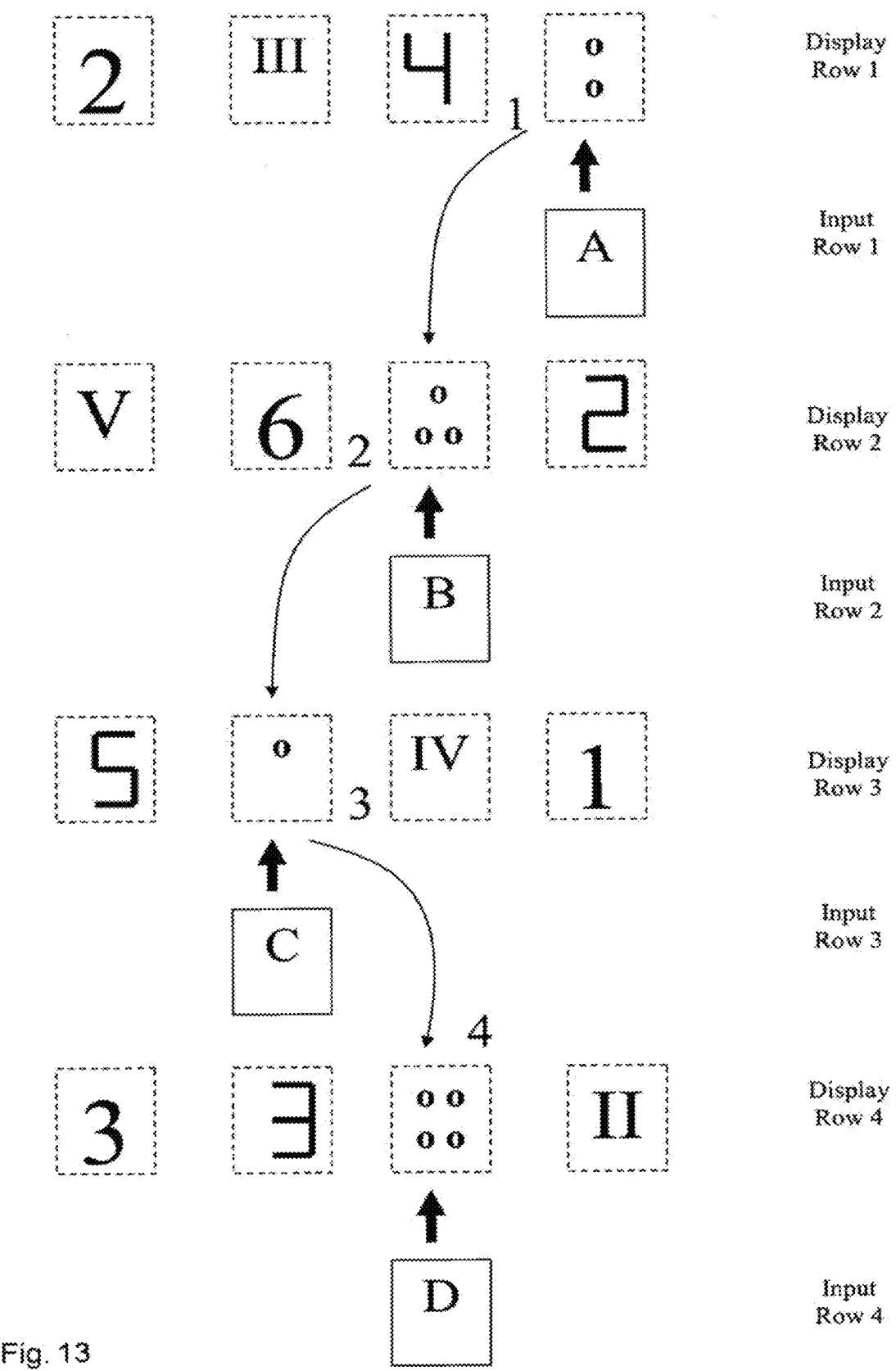
Figure 14:
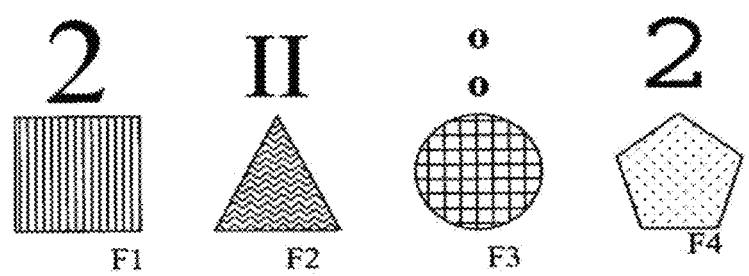

The invention is explained in more detail below based on the figures. They show:

FIG. 1: a plan view of a mobile radio terminal with touch-sensitive display;

FIG. 2: the assignment of certain fingerprints upon an "input code"-request to different colored function areas;

FIG. 3: an assignment of different fingerprints upon an "input code"-request to different symbols;

FIG. 4: a sequence of several inputs (input scheme) depending on the color of symbols;

FIG. 5: A sequence of several inputs (input scheme) depending on the shape of symbols;

FIG. 6: A sequence of several inputs (input scheme) depending on the number of angles of symbols;

FIG. 7: A sequence of several inputs (input scheme) depending on the size of the displayed symbols;

FIG. 8: An alternative set of pictograms;

FIG. 9: An example of user input with associated pictograms;

FIG. 10: A sequence of several inputs (input scheme) depending on changing pictograms;

FIG. 11: An alternative assignment of numerical symbols of different types to different input surfaces;

FIG. 12: A sequence of several-inputs (input scheme) depending on the displayed numerical value;

FIG. 13: A sequence of several inputs (input scheme) depending on displayed numerical values in the form of dice spots;

FIG. 14: Another example of possible combinations of color numerical values and numeric symbols.

FIG. 1 shows a plan view of a mobile radio terminal 1 with touch-sensitive display surface 2 (touch-sensitive display, so-called touch screen). When the display 2 of the mobile radio terminal 1 is touched by a finger, the fingerprint 3 is read in by means of the touch-sensitive display 2 comprising, for example, an optical, capacitive or pressure sensitive fingerprint scanner. Furthermore, the mobile radio terminal 1 has control keys 4 for confirmation "Yes" of, or negative response "No" to certain questions. Furthermore, the mobile telephone 1 has a is further fingerprint reader 5 for reading in a fingerprint of a user.

By the registration of a the fingerprint 3 by means of the touch-sensitive display 2 of the mobile telephone 1, the authorization process can be carried out by scanning (reading in) the fingerprint instead of a PIN request.

FIG. 2 shows the assignment of specific colored areas, to which the functions F1-F4 are assigned. To this end, the touch-sensitive display 2 of the mobile telephone 1 is divided into 4 different areas, wherein the display surface 2 is suitable for showing different colors, symbols, pictograms, alphanumeric characters etc., so that the touch-sensitive display 2 is on the one hand a display area and on the other hand a registration area for user inputs, in particular for fingerprints.

Colors are shown in the figures in that a first color 1, for example, red, is shown by vertical lines, a second color 2, such as, for example, green, is shown by wavy lines. a third color 3, for example, blue, is shown by grid lines and a fourth color 4, such as, for example, yellow, is shown in the form of a dotted area. In FIG. 2, different colored fields are assigned to the functions F1 to F4 and an actuation of the different colored function fields F1 to F4 can be carried out by touching the touch-sensitive display (touch screen) 2 of the mobile radio terminal 1 by a specific finger as outlined in the following. The mobile radio terminal 1 is only one example, however. Alternatively, it can be a touch-sensitive display device of any application and function. A mobile radio terminal thereby represents only a particularly preferred application of the invention.

In the representation in FIG. 2, the forefinger A, the middle finger B, the ring finger C and the little finger D are provided as possible fingers for activating one of the specific functions F1 to F4. The forefinger A is assigned and able to activate function F1 by touching the red colored area of the display. The middle finger B is assigned and able to activate function F2 by touching the green colored area of the display. The ring finger C is assigned and able to activate function F3 by touching the blue colored area of the display. And the little finger D is assigned and able to activate function F4 by touching the yellow colored area of the display. These fingerprints of the fingers A to D have previously been read in and stored.

Figure 3A:
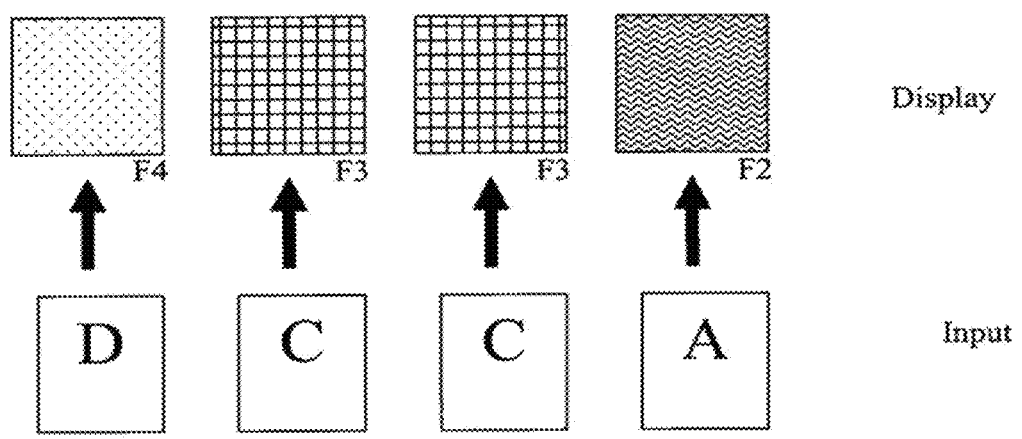

As shown in FIG. 3, however, the input scheme to activate a specific function can also alternatively take place in that the function field F4 first is actuated with the little finger D once, then the function field F3 is actuated twice with the ring finger C and last the function field F2 is actuated with the forefinger A once. With the input example shown in FIG. 3a, it is clear that the actuation of the areas F4, F3, F3, F2 consecutively with the fingers D, C, C, A characterizes a specific activation scheme assigned to a specific function, for example enabling the use of the device (1), instead of entering a PIN number. The activation can be carried out intuitively by the user, since he becomes accustomed to this actuating sequence and memorizes it.

Figure 3B:
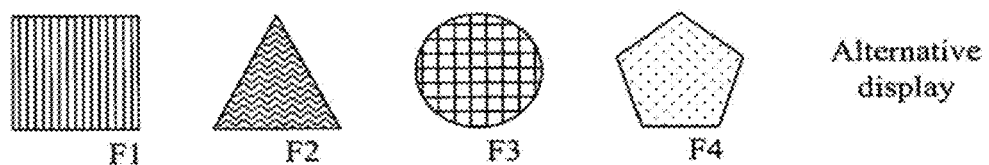

An alternative display is shown in FIG. 3b, i.e., an alternative assignment of the touch-sensitive surfaces of the touch-sensitive display of the device with functions F1 through F4. in the example shown in FIG. 3b, a distinction is made on the one hand according to the colors F1: Red (shown in the figures as an area with vertical stripes)
F2: Green (shown in the figures as an area with wavy lines)
F3: Blue (shown in the figures as an area with grid lines)
F4: Yellow (shown in the figures as a dotted area) as well as furthermore by the shapes of the symbols shown
F: Square
F2: Triangle
F3: Circle
F4: Pentagon The variation of combinations can be clearly expanded hereby. It is also possible that in each case a row with symbols is displayed in a pseudo-random manner, but only one correct one can be selected. In the example shown in FIG. 4, the selection and input of an input scheme is carried out based on the color of symbols. In the example shown in FIG. 4, the user has initially defined a color selection "green symbol" (characterized by wavy lines) and confirms the input with the fingers A to D, which had been previously defined and assigned to an activation scheme as well. Alternatively, the finger A (forefinger) can be defined for all inputs, as also applies below to the examples shown in the further figures.

As explained, the selection and input scheme in the example shown in FIG. 4 is carried out based on the color of the symbols shown. With the example shown in FIG. 5, the selection and input scheme is carried out based on the shape of the symbol, wherein here in each case the triangle is selected with the different inputs.

In the example shown in FIG. 6, the selection and input scheme is carried out based on the number of the angles of the symbols which is carried out here successively in ascending order from circle via triangle and the square to the pentagon with fingers A, B, C and D.

In the example shown in FIG. 7, the input scheme follows based on the size of the symbols, wherein in the example shown here the smallest symbol is selected in each case.

Alternatively to the previously shown symbols circle, triangle, square and pentagon, any other pictograms, such as, for example, the pictograms "Apple/Tree/Fish/Star" shown in FIG. 8 can also be selected.

These pictograms such as, for example, a "red apple" permit a linking with the input in the form of word combinations with the specific symbols, as is shown in FIG. 9.

The user hereby associates different word combinations such as, for example, by simultaneously pressing with fingers A and B, the symbols apple and tree equal apple tree. With the simultaneous pressing with fingers C and D of the symbols fish and star the term starfish is associated. Through these word associations it is easier for the user to perform an input sequence instead of entering a PIN number or a password.

In the following example according to FIG. 10, the input scheme is determined by corresponding word combinations and associations of symbols, as is shown in rows 1-4 according to FIG. 10.

Instead of colored areas, symbols, etc., as previously described, of course only alphanumeric characters such as numbers or quantities (dice spots) could also be used as a deciding or distinguishing feature, as is shown by way of example in FIG.

FIG. 11 shows four different examples for displaying the numerical value 2 as an Arabic number, as a Roman numeral, as a dice spot display and in a digital display. A corresponding example of an input scheme by means of a fingerprint is shown in FIG.

The device expects to be touched in specific areas of the display indicating the numerical value 2 in different representational methods according to rows 1 through 4 with the finger sequence A, B, C, D. If this input scheme is performed by the user, the function having an activation scheme corresponding to that input scheme is activated.

In the example shown in FIG. 13, the input scheme is carried out by the selection of the respective symbol "dice spots" as a distinguishing feature.

FIG. 14 shows a further example of display options. Numerical values in different representational methods (Arabic, Roman, dice spots, digital or the like) as well as different colored symbols red (perpendicular stripes), green (wavy lines), blue (grid lines), yellow (dotted area) and furthermore geometric shapes (square, triangle, circle, pentagon) are thereby linked to one another, whereby a much higher number of possible variations results.

The advantage of the invention thus lies in the intuitive operation. A specific function, such as, e.g., quick dial to call a specific person, can be selected very quickly with a mobile telephone without different submenus such as, for example, address book or the like. This can also mean accordingly different links for different authorized users with the same device, depending on which fingerprints are stored for which functions. The input by means of a fingerprint in combination on colored areas and/or symbols and/or pictograms in a certain sequence makes it easy for the user to input associations and the correct code, since he no longer has to memorize numbers or passwords but only the assignment of finger to area or symbol, which becomes automatic with repeated operation.

The variation of entry possibilities thereby permits an open entry in front of other people. Although the entry can be observed, other people cannot draw conclusions about the entry, since they will not understand the logic behind the input scheme. The fundamental risk as exists when eavesdropping on a numerical PIN, thus does not exist with the invention. As an input scheme is assigned to a specific function that can be carried out on the electronic device, this input scheme is a kind of code or encoded input to control the functions of the device by means of fingerprints.

The invention claimed is:

1. A method of acquiring user input and performing a predetermined one of a plurality of functions of an electronic device having a touch-sensitive display surface configured to register fingerprints, the method comprising the steps of:
determining the functions of the electronic device,
reading-in and storing one or more fingerprints of a user,
assigning to each of the several functions a respective input scheme and defining each input scheme by
successively or simultaneously displaying on the display different colors or symbols or pictograms or alphanumeric characters or a combination of at least two of the colors, symbols, pictograms, or alphanumeric characters to indicate different limited areas of the touch-sensitive display surface, enabling the limited areas of the touch-sensitive display surface to respond to a touch by the user, predetermining a sequence of the limited areas to be touched successively to activate the predetermined one function, and assigning to each of the limited areas of the sequence one of the stored fingerprints of the user, performing an input sequence of a plurality of touches of the touch-sensitive display surface in one or more of the limited areas with one or more fingers of the user successively, registering with the touch-sensitive display surface the fingerprints of the user when it is touched, and only activating or performing the predetermined one function of the device if the performed input scheme corresponds to the defined input scheme assigned to the one predetermined function.

2. The method according to claim 1, wherein the one predetermined function to be performed is to enable use of the device, whereby entry of a personal identification number for enabling use of the device is rendered unnecessary.

3. The method according to claim 1, further comprising the step of:

checking the registered fingerprints for matches with one or more of the stored fingerprints.

4. A method of acquiring user input and performing a predetermined one of a plurality of functions of an electronic device having a touch-sensitive display surface configured to register fingerprints, the method comprising the steps of:

determining the functions of the electronic device, reading-in and storing one or more fingerprints of a user, assigning to each of the several functions a respective input scheme and defining each input scheme by statically or dynamically displaying in all or a part of different limited areas of the touch-sensitive display surface different colors or symbols or pictograms or alphanumeric characters or a combination of at least two of the colors, symbols, pictograms, or alphanumeric characters, enabling the limited areas of the touch-sensitive display surface to respond to a touch by the user, predetermining a sequence of the limited areas to be touched successively to activate the predetermined one function, and assigning to each of the limited areas of the sequence one of the stored fingerprints of the user, performing an input sequence of a plurality of touches of the touch-sensitive display surface in one or more of the limited areas with one or more fingers of the user successively, registering with the touch-sensitive display surface the fingerprints of the user when it is touched, and only activating or performing the predetermined one function of the device if the performed input scheme corresponds to the defined input scheme assigned to the one predetermined function.

5. The method according to claim 1, wherein the touch-sensitive display surface is a part of the electronic device whose specific function is activated or performed depending on the touched area or areas of the touch-sensitive display surface, the registered fingerprints and the input sequence.

6. The method according to claim 1, wherein the touch-sensitive display surface is a part of an external device that controls the electronic device.

7. The method according to claim 6, further comprising the step of:

transmitting the data acquired in the external device to the electronic device to be controlled via a wire connection or via a radio connection using IRDA, Bluetooth, WLAN or RFID.

8. An electronic device configured to carry out the method according to claim 1.

9. The electronic device according to claim 8, wherein the electronic device is a computer.

10. The electronic device according to claim 8, wherein the electronic device is a mobile radio terminal.

11. The electronic device according to claim 8, wherein the predetermined one function is only activated or performed when a plurality of the limited areas have been touched in the predetermined input sequence by specific fingers whose registered fingerprints are stored and recognized.

12. The method according to claim 4, wherein the one predetermined function to be performed is to enable use of the device, whereby entry of a personal identification number for enabling use of the device is rendered unnecessary.

13. The method according to claim 4, further comprising the step of:

checking the registered fingerprints for matches with one or more of the stored fingerprints.

14. The method according to claim 4, wherein the touch-sensitive display surface is a part of the electronic device whose specific function is activated or performed depending on the touched area or areas of the touch-sensitive display surface, the registered fingerprints and the input sequence.

15. The method according to claim 4, wherein the touch-sensitive display surface is a part of an external device that controls the electronic device.

16. The method according to claim 15, further comprising the step of:

transmitting the data acquired in the external device to the electronic device to be controlled via a wire connection or via a radio connection using IRDA, Bluetooth, WLAN or RFID.

17. An electronic device configured to carry out the method according to claim 4.

18. The electronic device according to claim 17, wherein the electronic device is a computer.

19. The electronic device according to claim 17, wherein the electronic device is a mobile radio terminal.

20. The electronic device according to claim 17, wherein the predetermined one function is only activated or performed when a plurality of the limited areas have been touched in the predetermined input sequence by specific fingers whose registered fingerprints are stored and recognized.

* * * * *